US009292607B2

(12) United States Patent  
Parthasarathy et al.

(10) Patent No.: US 9,292,607 B2  
(45) Date of Patent: Mar. 22, 2016

(54) USING SOCIAL-NETWORK DATA FOR IDENTIFICATION AND RANKING OF URLS

(75) Inventors: Sasi Parthasarathy, Seattle, WA (US); Junaid Ahmed, Bellevue, WA (US); Walter Sun, Bellevue, WA (US); Jingfeng Li, Issaquah, WA (US); Paul Alexander Dow, San Francisco, CA (US); Yajie Siamwalla, Belmont, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 628 days.

(21) Appl. No.: 13/196,008

(22) Filed: Aug. 2, 2011

(65) Prior Publication Data

US 2012/0150833 A1   Jun. 14, 2012

Related U.S. Application Data

(63) Continuation-in-part of application No. 12/964,092, filed on Dec. 9, 2010.

(51) Int. Cl.
G06F 17/30 (2006.01)
(52) U.S. Cl.
CPC .... *G06F 17/30867* (2013.01); *G06F 17/30876* (2013.01)
(58) Field of Classification Search
None
See application file for complete search history.

(56) References Cited

U.S. PATENT DOCUMENTS

| | | | |
|---|---|---|---|
| 6,625,589 B1 | 9/2003 | Varma | |
| 6,718,365 B1 | 4/2004 | Dutta | |
| 7,231,405 B2 | 6/2007 | Xia | |
| 7,725,422 B2 | 5/2010 | Ryan et al. | |
| 7,779,001 B2 | 8/2010 | Zeng et al. | |
| 8,073,850 B1 * | 12/2011 | Hubbard et al. | 707/736 |
| 8,494,897 B1 | 7/2013 | Dawson | |
| 2006/0173985 A1 | 8/2006 | Moore | |
| 2007/0244857 A1 | 10/2007 | Yu | |
| 2007/0245020 A1 | 10/2007 | Ott | |
| 2008/0270404 A1 | 10/2008 | Borkovsky et al. | |
| 2009/0282000 A1 | 11/2009 | Bennett | |
| 2010/0205168 A1 | 8/2010 | Yang et al. | |

(Continued)

OTHER PUBLICATIONS

Lawrence, "Accessibility of information on the web," Published Date: 2000, Nature, vol. 400, Jul. 8, 1999, www.nature.com, 3 pp.

(Continued)

*Primary Examiner* — Miranda Huang
(74) *Attorney, Agent, or Firm* — Dave Ream; Jim Ross; Micky Minhas

(57) ABSTRACT

Methods, systems, and computer-readable media are provided for updating a search index with new uniform resource locators (URLs) and with metadata for new and known URLs. Data associated with communications made by users using a social network is received. The communications include a URL therein that a user has shared, posted, or otherwise communicated to one or more other users using the social network. When the URL is not found in a search index it is identified as a new URL and is added to the search index. A measure of a trending interest, or virality, of the URL is determined from the data. The determined virality is associated with the URL in a search index as metadata. The virality is useable to inform a ranking of the URL against a plurality of other URLs for identification and presentation as a search result in a search engine results page.

16 Claims, 8 Drawing Sheets

(56) References Cited

U.S. PATENT DOCUMENTS

2010/0325107 A1  12/2010  Kenton et al.
2011/0119126 A1  5/2011  Park et al.

OTHER PUBLICATIONS

Spertus, "ParaSite: Mining Structural Information on the Web," Published Date: 1997, The Sixth International World Wide Web Conference, Apr. 1997, Univ. of Washington, Seattle, WA., http://people.mills.edu/spertus/Papers/parasite97.pdf, 13 pp.
"Gruhl, ""The Web Beyond Popularity."" Published Date: 2006, WWW 2006, May 23-26, 2006, Edinburgh, Scotland, http://www2006.org/programme/files/pdf/29.pdf, 10 pp.".
Nonfinal OA mailed Mar. 12, 2012, in U.S. Appl. No. 12/964,092, 22 pp.
Kumar, et al., "An Effective Method for Ranking of Changed Web Pages in Incremental Crawler", in International Journal of Computer Applications, vol. 8, Issue 7, Oct. 2010, 4 pages.
Chi, et al., "Information Seeking with Social Signals: Anatomy of a Social Tag-based Exploratory Search Browser", in Intelligent User Interfaces Conference Workshop on Social Recommender Systems, Feb. 7-10, 2010, 8 pages.
Sullivan, Danny, "Bing, Now With Extra Facebook: See What Your Friends Like & People Search Results", Retrieved on: Apr. 25, 2011, Available at: http://searchengineland.com/bing-now-with-extra-facebook-see-what-your-friends-like-52848.
Sullivan, Danny, "What Social Signals Do Google & Bing Really Count?", Retrieved on: Apr. 25, 2011 Available at: http://searchengineland.com/what-social-signals-do-google-bing-really-count-55389.
Stamoulis, Nick, "Social Media Signals and What it Means for SEO", Retrieved on: Apr. 25, 2011 Available at: http://www.searchenginejournal.com/social-media-signals-and-what-it-means-for-seo/28730/.
Cutts, Matt, "Social Signals, Author Authority, Ranking Factors & Google Realtime", Retrieved on: Apr. 25, 2011 Available at: http://blog.searchenginewatch.com/101222-114000.
Kline, David, "Social Signals and Search at SMX West", Retrieved on: Apr. 25, 2011, Available at: http://community.microsoftadvertising.com/blogs/advertiser/archive/2011/03/08/social-signals-amp-search.aspx.
Final Office Action, mailed Sep. 11, 2012, in related case U.S. Appl. No. 12/964,092, 29 pp.
Nonfinal OA mailed Mar. 18, 2014, in U.S. Appl. No. 12/964,092, 52 pp.
Non-Final Office Action dated Jun. 11, 2015 in U.S. Appl. No. 12/964,092, 27 pages.

* cited by examiner

US 9,292,607 B2

USING SOCIAL-NETWORK DATA FOR IDENTIFICATION AND RANKING OF URLS

CROSS-REFERENCE TO RELATED APPLICATIONS

This application is a continuation-in-part of U.S. patent application Ser. No. 12/964,092 filed Dec. 9, 2010, the disclosure of which in hereby incorporated herein by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed-Description section. This Summary is not intended to identify key features or essential features of the claimed subject matter, nor is it intended to be used as an aid in isolation to determine the scope of the claimed subject matter. In brief and at a high level, this disclosure describes, among other things, ways to identify new URLs (uniform resource locators) and to gather metadata associated with URLs from data associated with communications made by uses using a social network.

In an embodiment of the invention, data associated with communications made by users using a social network is received. The data includes the content and/or indications of any communications made by users using the social network such as a post made to a message board, the sharing of a web page, and an indication of an interest in a particular thing, idea, website, or the like. URLs that are included in the data are identified and compared to a search index to identify new URLs. The new URLs are added to the search index.

In addition, a virality of the new and known URLs that are included in the data is also determined; the virality includes a measure of an amount of activity or user interest that is associated with a particular URL. The virality may be stored with a respective URL as metadata in a search index and is useable to inform a ranking of the respective URL with a group of URLs that are identified as search results for a received search query.

DESCRIPTION OF THE DRAWINGS

Illustrative embodiments of the invention are described in detail below with reference to the attached drawing figures, and wherein.

DETAILED DESCRIPTION

Figure 1:
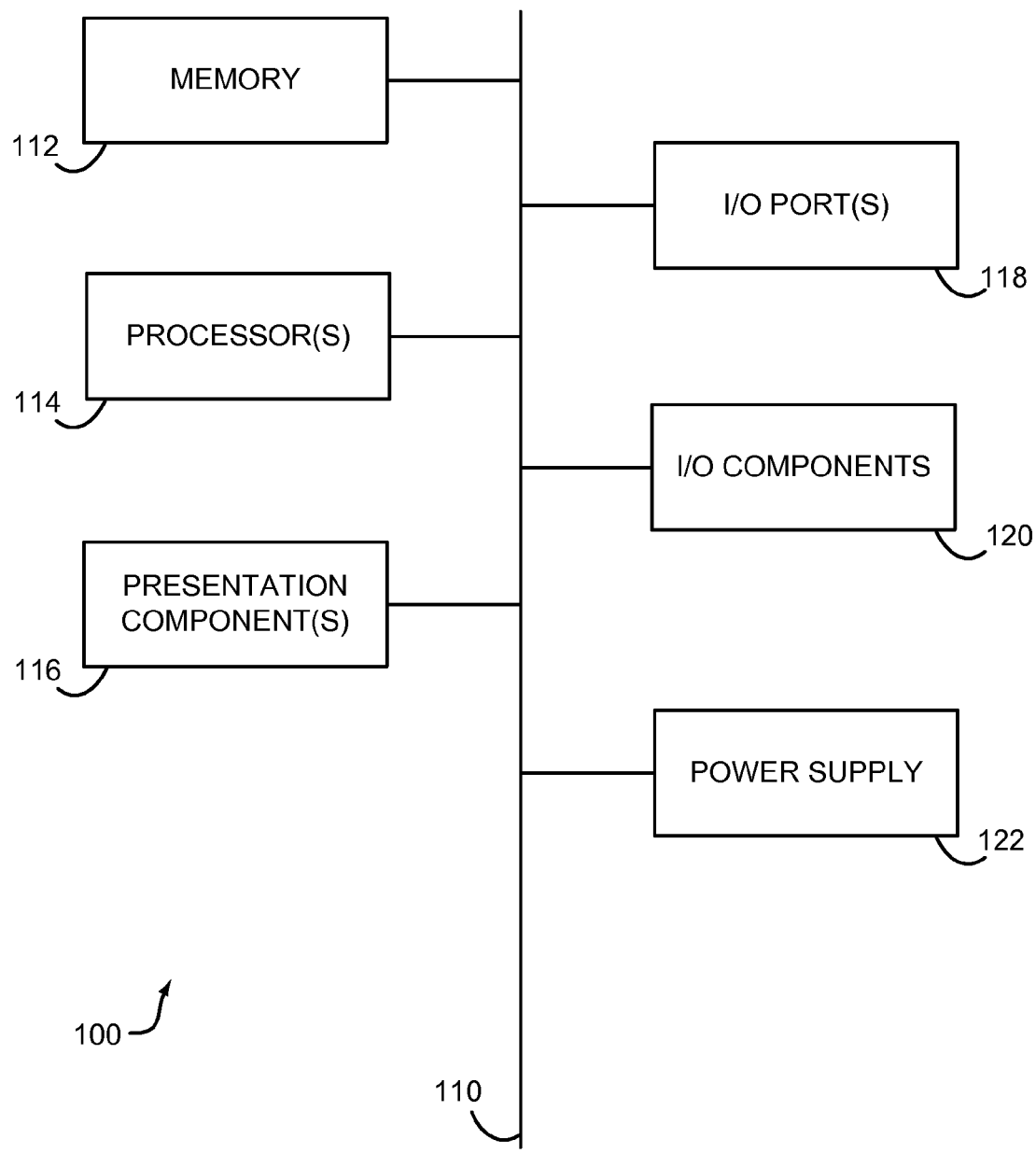
FIG. 1 is a block diagram depicting an exemplary computing device suitable for use in an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Known methods for updating search indexes with newly published documents employ obtaining or receiving data from known domains such as by a RSS (really simple syndication) feed. The data provides indications of the newly added documents on the domain. This method is slow. It relies on the domain to publish the data which may take anywhere from a few minutes to days, weeks, or longer depending on the domain's activity. And obtaining such data requires knowledge that the domain exists; if the domain is unknown then no RSS feeds are tracked originating from the domain and there is no direct motive to discover the domain or updates published thereto.

Additionally, known URLs and published documents might be parsed to identify URLs located therein and those identified URLs parsed to identify new or previously unknown URLs. This method can be very cumbersome due, at least, to the sheer size of the Internet and the number of documents that must be evaluated to identify new URLs.

Embodiments of the invention include methods, systems, and computer-readable media for updating a search index to include newly identified or newly published URLs and to include indications of user interest in the URLs. In an embodiment, a computer-implemented method for identifying and ranking new URLs is described. Data associated with communications made by users using a social network is received. A URL included in the data is identified and the URL is determined to be a new URL that is not included in a search index of a search engine. The URL is added to the search index. A virality of the URL is determined based on the data; the virality includes a measure of the communications associated with the URL on the social network. The virality is stored as metadata for the URL in the search index.

In another embodiment, computer-readable media having computer-executable instructions embodied thereon that, when executed by a computing device having a processor, perform a method for ranking a URL for placement on a search engine results page is described. Data associated with communications made by users using a social networking website and that includes a URL is received. A virality of the URL is determined. A search query is received for which the URL is a search result candidate. The URL is ranked against a plurality of other search results candidates based at least partially on the virality. And the URL is provided for presentation as a search result on a search engine results page with respect to the ranking.

In another embodiment, a system for updating a search index with new URLs and with metadata indicating a virality of the new URLs and known URLs based on data associated with communications on a social networking website is described. The system includes one or more computing devices configured to provide a receiving component, a new-URL-identification component, a virality-determining component and a ranking component. The receiving component is configured to receive data associated with user communications made using a social networking website—the communications including a URL therein. The new-URL-identification component is configured to determine that the URL is one of a new URL that is not included in a search index or a known URL that is included in the search index, and to add the new URL to the search index. The virality-determining component is configured to determine a measure of the communications associated with the URL on the social networking website and to store the measure as metadata for the URL in the search index. The ranking component is configured to rank the URL against a plurality of other URLs based at least partially on the measure.

Exemplary Operating Environment

Referring initially to FIG. 1 in particular, an exemplary operating environment for implementing embodiments of the invention is shown and designated generally as a computing device 100. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output ports 118, one or more input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device 100 that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media include computer-storage media and computer-storage devices and are mutually exclusive of communication media, e.g. carrier waves, signals, and the like. By way of example, and not limitation, computer-readable media may comprises Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical or holographic media; magnetic cassettes, magnetic tape, magnetic disk storage or other magnetic storage devices, or any other medium that can be used to encode desired information and be accessed by computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Exemplary Network Environment

Figure 2:
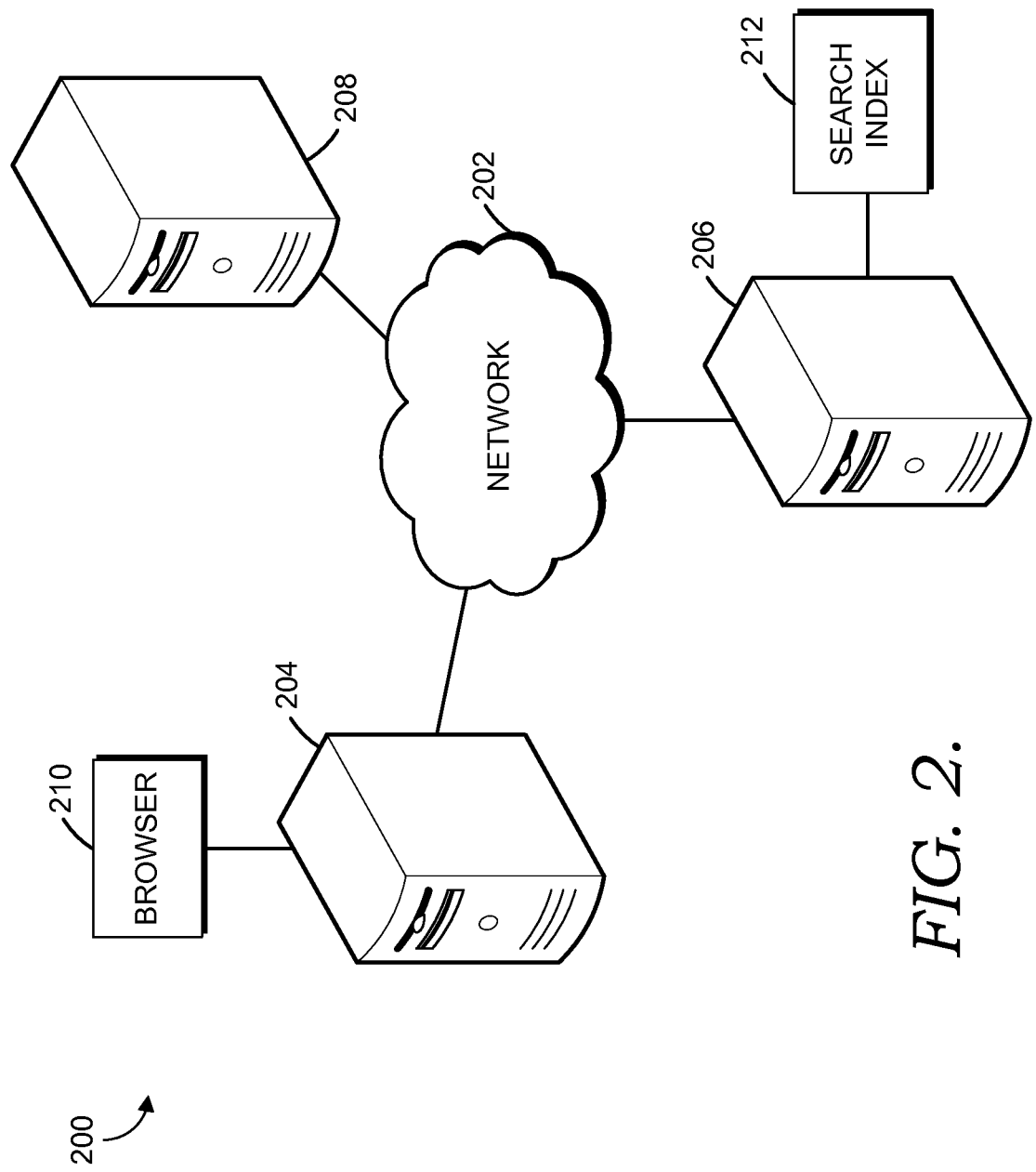
FIG. 2 is a block diagram depicting an exemplary operating environment suitable for use in an embodiment of the invention.

Referring now to FIG. 2, a block diagram of an exemplary network environment suitable for use in implementing embodiments of the invention is generally designated as numeral 200. The network environment 200 depicted in FIG. 2 is only one exemplary environment—of which there may be many—suitable for implementing embodiments of the invention. The components depicted in FIG. 2 are depicted singularly for clarity and are provided with names for reference but, one of ordinary skill in the art will recognize that a plurality of similar components may be used in application and that the nomenclature for the components may change without distracting from the functions described herein. For example, millions of computing devices might be accessing or connected to a network. Further, the nomenclature applied to a particular component in the environment 200 may change with respect to functions being performed thereby.

The environment 200 includes a network 202, user's computing device 204, a search-index-update server 206, and a social-network server 208. The network is any available computing or communications network such as, for example, and not limitation, the Internet, an intranet, a local area network (LAN), a wireless access network (WAN), and combinations thereof. The user's computing device 204, the search index update server 206 (server 206), and the social-network server 208 comprise any one or more computing devices, such as the computing device 100 described above. Each of the devices 204, 206 and 208 is configured to access the network 202 and to communicate/receive data from other computing devices via the network 202 as is known in the art. Further detail of the devices 204, 206 and 208 in addition to that provided below, is not necessary for understanding and describing embodiments of the invention and, as such, is not provided herein.

The user's device 204 includes a browser application 210 (also referred to herein as a browser 210). The browser 210 is any browser application now known or later developed that is configurable to access documents via the network 202 such as web pages, websites, domains, folders, files, and the like. The browser 210 may access these documents, for example, using a search engine. In an embodiment, the browser 210 comprises Internet Explorer® from Microsoft Corporation of Redmond, Wash., U.S.A., or Firefox® from Mozilla Corporation of Mountain View, Calif., U.S.A., among others.

The documents are accessed by the browser 210 using an address or locator such as a web address, URL, URI (uniform resource identifier), IP (internet protocol) address, or another indication of the documents or their location in the network. The address or location of documents on the network is referred to herein as a URL, however, such is not intended to limit embodiments of the invention to use of a URL specifically—any indicator of document location is useable in embodiments of the invention.

With continued reference to FIG. 2, the search-index-update server 206 is configured to receive social-signal data. Social-signal data included data associated with communications made by users using a social network, social-networking website, or online-social-networking service (hereinafter collectively referred to as a "social network"). The social network comprises any available online service, platform, or website that focuses on building and reflecting social networks or social relations among people. The social network might comprise, for example, and not limitation, FACEBOOK of Palo Alto, Calif., MYSPACE of Santa Monica, Calif. or TWITTER of San Francisco, Calif.

The social network allows users to exchange and/or publish posts, comments, blog entries, instant messages, emails, and the like via an online, web-based service or website. These communications are provided with various names by their respective social networks and include, for example, and not limitation, a "like" and a "share" as used by members of FACEBOOK or a "tweet" or a "retweet" as used by members of TWITTER. A "like" comprises an indication by a user that he or she has an interest in an item. The item may comprise a photo, a website, another user, or the like. A "share" comprises a communication by a user that provides an item to one or more other users of the social network either directly or via an interface that is accessible by each of the one or more other users. And a "tweet" comprises a short post (up to 140 text characters) to a blog or microblog and a "retweet" comprises a secondary posting of a tweet to a blog/microblog of another user. Although specific exemplary communications are described above, any social network communications are useable in embodiments of the invention.

With continued reference to FIG. 2, the server 206 includes a search index 212 that is employed by one or more search engines to identify search results for search queries submitted thereto. The search index 212 may be stored in a memory at the server 206 or may be remotely accessible by the sever 206. The search index 212 is useable by a search engine to identify search results for a search query. The search index 212 provides search result candidates and associated metadata in any desired data structure that is useable by the search engine. Such data structures might include an inverted index, a flat index, and the like.

In an embodiment, the search index 212 includes a general index and a fresh index. The general index is any search index employed by a search engine to identify search results. In an embodiment, the general index is the main or full search index used by the search engine. The fresh index is also any search index used by the search engine to identify search results, however, the fresh index is much smaller in size and may use the same or different data structure as the general index to provide ease of access and updating.

The fresh index is updated more frequently than the general index and is used to update the general index. For example, the fresh index might be updated continuously in real-time while the general index is only updated every twenty-four hours. Further, the general index is updated by incorporating the data in the fresh index into the general index. In an embodiment, upon updating the general index, the fresh index is cleared and integration of data therein begins anew. As such, the processing required to process updates to the larger general index is confined to fewer instances while the smaller fresh index is more easily updated at much more frequent intervals without consuming a great deal of processing power.

The server 206 is also configured to parse the social-signal data to identify URLs that are new and metadata for new and known URLs. New URLs include URLs that were unknown to the server 206 prior to parsing the social-signal data or that are not included in the search index 212. For example, a new document might be posted to a website; a URL linking to the new document is a new URL because it is not previously known by the server 206 or included in the search index 212.

The social-network server 208 is any computing device of a social network that is configured to provide the social-signal data. The social-signal data is provided via any available means including a really simple syndication (RSS) feed, access to a database at the social-network server 208, or another listing of communications on the social network and/or associated metadata. In an embodiment, the social-network server 208 provides an open flow or "fire hose" of all communications made by users of the social network on the social network. The social-network server 208 might also limit or restrict the provided social-signal data based on one or more criteria, licensing agreements, privacy agreements, or the like. The social-signal data might also be prepared in any desired manner prior to provision to or access by the server 206.

The social-signal data provided by the social-network server 208 includes an indication of one or more URLs that are included in a communication of a member user of the social network. The URLs communicated by the member user include URLs listed on a web page dedicated to the member user and URLs within text of the member user's communications. The URLs might also include URLs posted by the member user on web pages dedicated to other members of the social network, emails, instant messages, and the like. The social-signal data might also include the content of the member user's communications including any associated text, images, videos or other content.

Exemplary Embodiments

Figure 3:
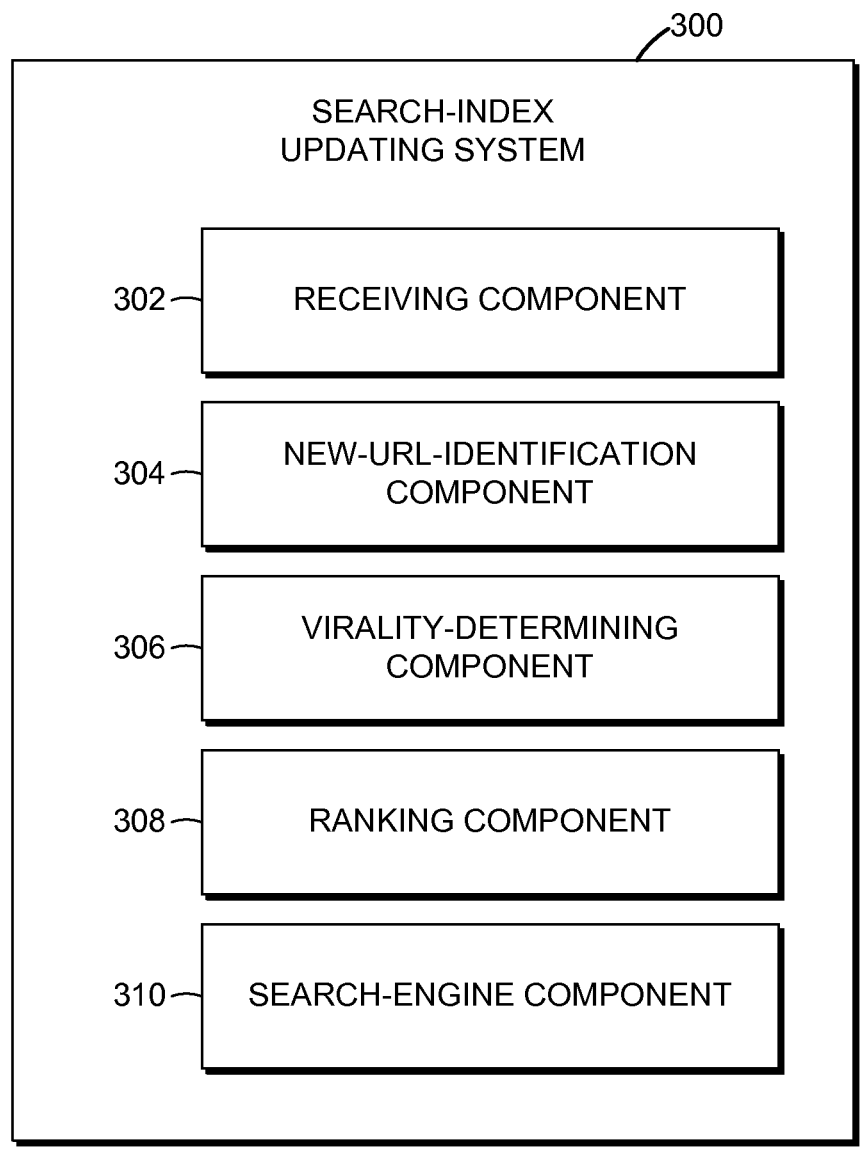
FIG. 3 is a block diagram depicting a system for updating a search index to include new URLs and metadata for new and known URLs in accordance with an embodiment of the invention.

With reference now to FIG. 3, a system 300 for updating a search index to include new URLs and metadata for new and known URLs in accordance with an embodiment of the invention is described. The system 300 includes a receiving component 302, a new-URL-identification component 304, a virality-determining component 306, and a ranking component 308.

The receiving component 302 is configured to receive social-signal data from a social-network. The social-signal data can be received directly from systems of the social network or from an intermediate server. The receiving component 302 parses the social-signal data to identify communications made by users of the social network that include at least one URL therein. As described above, the identified communications may comprise a user's indication of interest in a URL (e.g. a document that is accessed via the URL), a user's posting of the URL to, for example, a blog or microblog or a user's sharing of the URL with one or more other users, among other communications.

The receiving component 302 identifies the URLs included in the communications. The URLs can be included in the communications in a full form, as a link/hyperlink, in a shortened form, or in any other identifiable form. For example, a user might type out a full URL in the communication or might include a hyperlink that, when selected, directs a browser application to the URL. Or the user might employ a URL shortening application or technique to provide the URL in a shortened form. In an embodiment, shortened URLs are expanded and/or normalized by the receiving component into a full or expanded version thereof. In an embodiment, the receiving component 302 determines a number of occurrences of each URL received in the social-signal data. In an embodiment, the number of occurrences of each URL includes the occurrences of the URL in both shortened and full forms. For example, the number of occurrences of a URL that is received in both a shortened form and in a full form are counted together to provide a total number of occurrences for the URL. The receiving component 302 might also rank or organize the URLs in order based on the number of occurrences in the social-signal data.

In an embodiment, the social network provides the social-signal data to an intermediate server that prepares the social-signal data by identifying the URLs contained in the social-signal data and the number of occurrences thereof. The intermediate server then provides the receiving component 302 with the prepared social-signal data. The intermediate server might also filter the social-signal data to reduce the amount of data provided to the receiving component 302 For example, the intermediate server might only provide the receiving component 302 with a group of 200,000 URLs that exhibited the most occurrences over a period of time. In an embodiment, the social-signal data is prepared by the social-network prior to providing the data to the receiving component 302.

The new-URL-identification component 304 is configured to identify URLs received in the social-signal data that are new. The component 304 compares the URLs in the social-signal data with one or more search indexes to determine whether the received URLs are already in the search indexes. When a URL is found that is not in the one or more search indexes, the URL is identified as a new URL and is added to at least one of the search indexes. In an embodiment, a search index includes a general index and a fresh index and, a new URL is added to the fresh index upon identification thereof.

The virality-determining component 306 is configured to determine a virality or a measure of the communications associated with a URL on the social networking website based on the received social-signal data. Communications among users of social networks are uniquely configured to allow information to spread quickly. For example, a first user might find a new document, such as a breaking news story, and share the new document with one or more second users by posting the URL for the document on a social network. The second users might also communicate the URL to one or more third users and so on—thus enabling a viral-like spread of the URL to users of the social network. The spread may also continue on one or more second social networks via users that are members of both networks providing such communications or via communications between members of disparate social networks.

Accordingly, the number of occurrences of a particular URL in the social-signal data and calculations based thereon are useable to determine a level of user interest across the one or more social networks generally. For example, a URL that is of great interest will likely be communicated a great number of times and will occur many times in the social-signal data. But a URL of little interest will have only a few occurrences in the social-signal data. And a URL that initially has little interest but that gains interest over time will also show a similar change in the number of occurrences in the social-signal data.

The virality of a particular URL may be as simple as determining a total number of occurrences of the URL in the social-signal over a period of time. For example, the number of occurrences of a URL in a fifteen minute time period might be determined. This total can then be compared to totals for other URLs or to totals for the same URL during other time periods. Additional calculations, such as averages, rates of change (velocity), quantity of users involved in the spread, acceleration of the spread, momentum of the spread and the like can also be determined. These measures and calculations are useable to identify URLs for which user interest is trending upward or "spiking," URLs with decreasing user interest and a general user interest in a particular URL.

Figure 4:
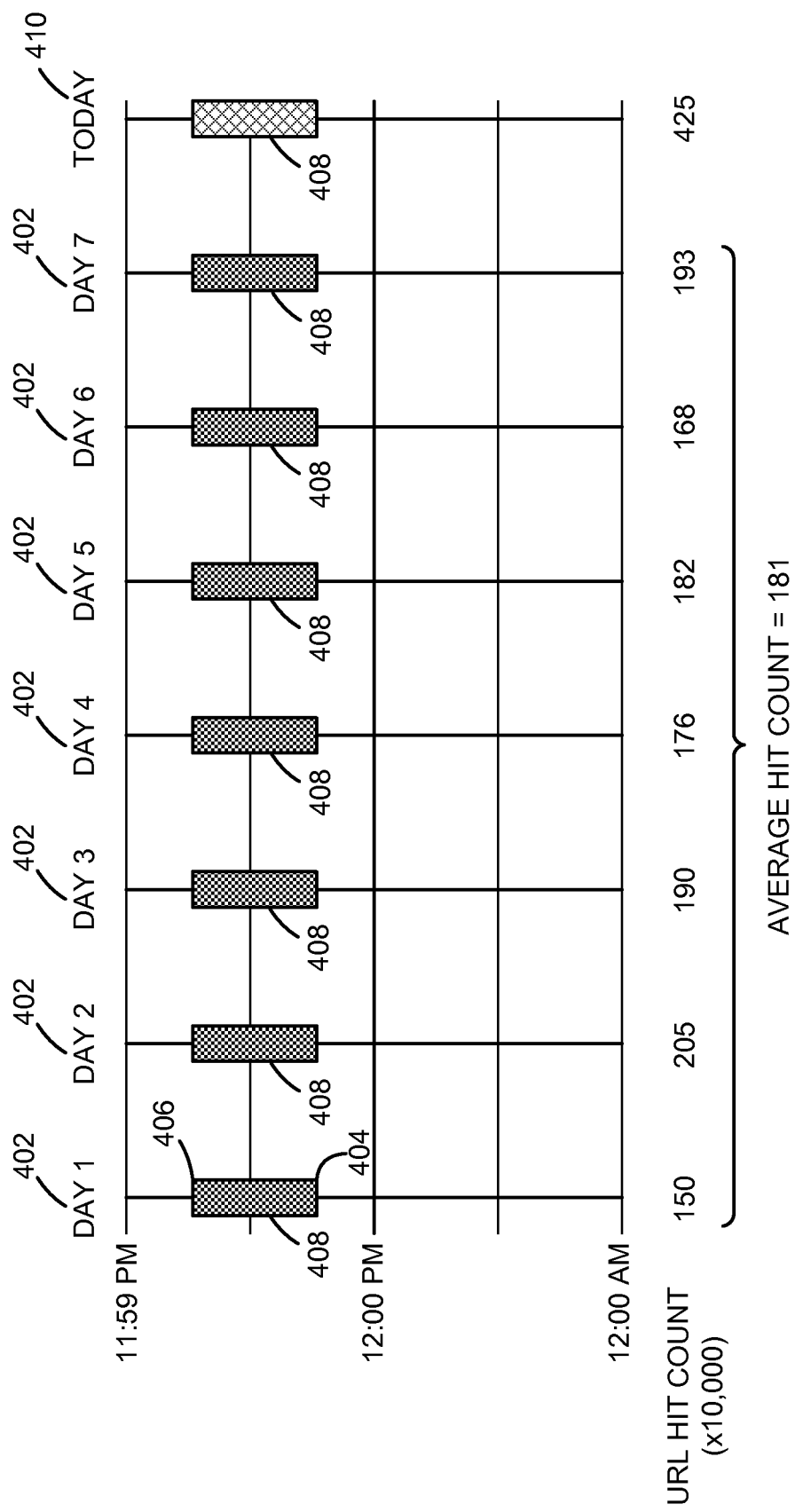
FIG. 4 is a chart depicting hit counts for a URL for the same time period in each of eight days in accordance with an embodiment of the invention.

For example, in an embodiment, an average number of occurrences of a particular URL in the social-signal data is determined over a number of previous days 402, as depicted in FIG. 4. In an embodiment, the average is determined over the most recent seven days 402. The average might also be determined over the most recent number of days that is an integer multiple of seven, e.g. the most recent fourteen, twenty-one, twenty-eight, etc. days. Using seven or a multiple thereof to determine the average number of instances of the particular URL avoids discrepancies in the determined average due to differences in traffic to the particular URL on weekend days, week days, and other variations between individual days.

The average is also determined based on the same time period within each of the previous days 402, e.g. the average is determined based the number of occurrences of the particular URL between a given start 404 and stop 406 time each day. For example, as depicted in FIG. 4, the average is determined for instances of the particular URL in a time period 408 between 3:00 PM and 9:00 PM each day. The time period 408 is depicted between 3:00 PM and 9:00 PM herein for exemplary purposes only and is not intended to limit embodiments of the invention to any specific time period. Calculating the average based on the same time period each day may alleviate variance in the average caused by factors such as, for example, and not limitation, URLs that are frequented more/less at different times of the day like a morning news website that has a greater number of hits in morning hours, or a gaming website that might have a greater number of hits in the evening hours.

With continued reference to FIG. 4, the number of occurrences of the particular URL in the social-signal data is compared to the average number of occurrences of the particular URL over the previous number of days 402 and within the time period 408. The particular URL is identified as a spiking URL when the number of occurrences of the particular URL in the social-signal data is sufficiently greater or is a predetermined amount greater than the average number of occurrences of the particular URL. In an embodiment, the particular URL is identified as a spiking URL when the number of occurrences is twice the average number of occurrences. As depicted in FIG. 4, the particular URL has "425" instances in the social-signal data today 410 for the time period between 3:00 PM and 9:00 PM; the average number of occurrences for the particular URL over that most recent seven days 402 is "181." Thus, the number of occurrences of the particular URL is greater than twice the average (e.g. "362") and the particular URL is identified as a spiking URL.

In another embodiment, a URL is identified as a new URL. Generally, no historical information is available for a new URL to determine a change in the number of occurrences of the URL over time or against an average. As such, the number of occurrences alone might be employed to determine a user interest level in the new URL. For example, a new URL that has only "15" occurrences in the social-signal data for one million communications probably has a low current level of user interest. In contrast, a new URL that occurs "300,000" times in the same social-signal data likely has a high user interest. In another embodiment, the number of occurrences of a new URL might be compared over short, consecutive time spans to determine a level of user interest or a rate of change therein until sufficient social-signal data is received over a longer period of time to provide further calculations.

The virality-determining component is also configured to store the measure or virality as metadata for the URL in the search index. The virality is stored in any desired form and in any desired manner that is useable by the ranking component 308 as described below.

The ranking component 308 is configured to rank a number of search result candidate URLs for placement on a search engine results page. In an embodiment, the ranking component 308 accesses the virality metadata for URLs that are identified by a search engine as search result candidate URLs. The ranking component 308 ranks the URLs based on the virality metadata such that URLs having high user interest based on the virality metadata are ranked higher than those with lower user interest. The URLs are thus placed on the search engine results page with the higher user interest URLs being placed in more prominent positions, e.g. higher in a listing of search results and at a top or central portion of the search engine results page. In another embodiment, the virality metadata is one of a plurality of signals or metadata employed by the ranking component 308 to rank search result candidate URLs. Additionally, the ranking component 308 employs the virality metadata for new URLs for which other signal data may be lacking to aid in ranking the new URLs against other search result candidate URLs that have a greater wealth of signal data.

In an embodiment, the system 300 also includes a search-engine component 310. The search-engine component 310 includes any search engine application now known or later developed that is configured to receive a search query, identify one or more search result candidates from a search index, and to provide one or more search results for presentation on a search engine results page. In an embodiment, the search-engine component 310 receives a search query from a user. The search query is executed using one or more search indexes that include virality metadata for at least one URL included therein. The URL is identified as a search result candidate URL and is ranked against one or more other search result candidate URLs using the virality metadata and one or more other signals. The search-engine component 310 provides the URL as a search result in a search engine results page for presentation to a user; the URL is displayed in the search engine results page based on the ranking.

Figure 5:
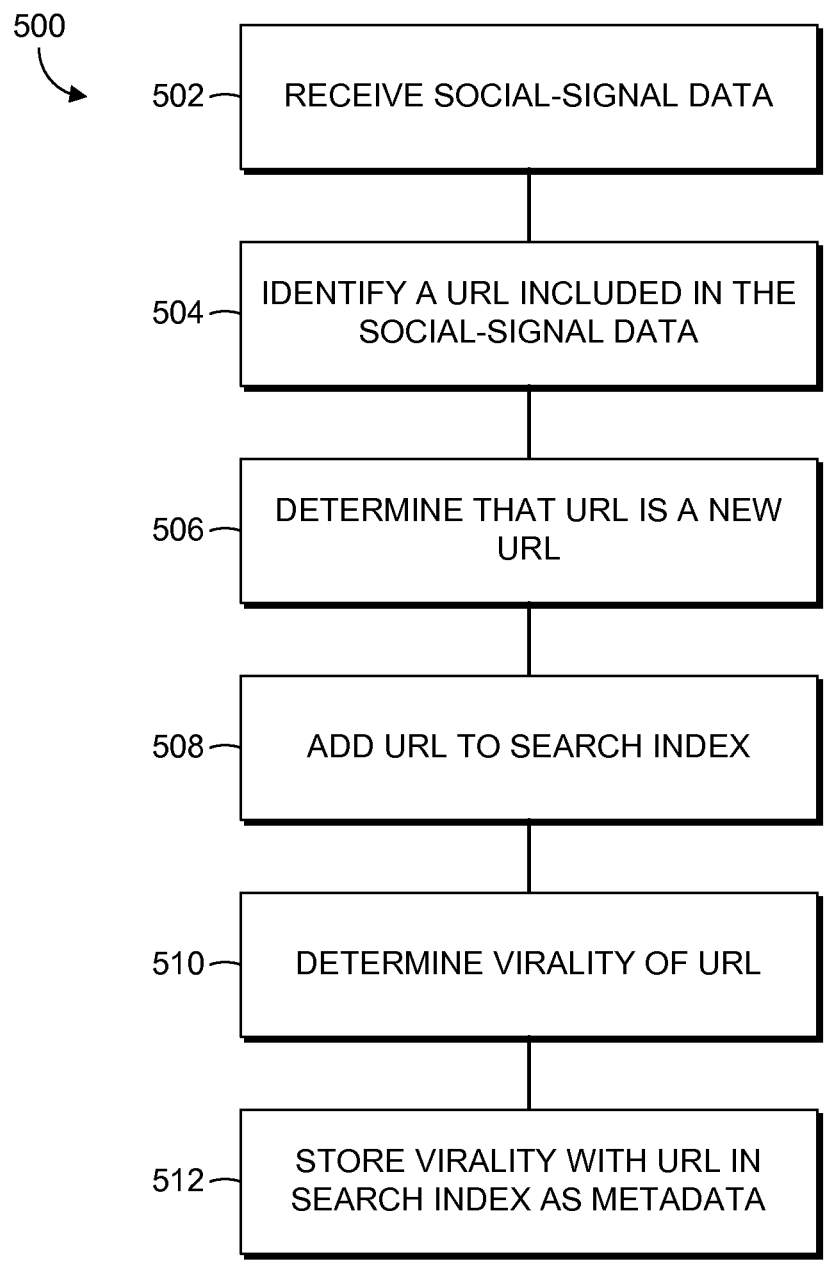
FIG. 5 is a flow diagram depicting a method for identifying and ranking new URLs in accordance with an embodiment of the invention.

With reference now to FIG. 5, a method 500 for identifying and ranking new URLs in accordance with an embodiment of the invention is described. At a step 502, social-signal data is received. The social-signal date is received from systems of a social network or from an intermediary device. In an embodiment, the social network permits access to the social-signal data on the social networks systems rather than pushing that social-signal data out for receipt. As described previously, the social-signal data includes communications made by users using the social network. The social-signal data includes the actual communications and their content or might be filtered in some manner.

At a step 504, a URL is identified within the social-signal data. The URL is included in the social-signal data in any available form including for example, a full format, a link, a shortened form, or the like. The URL is compared with a list of known URLs, such as a search index, and is determined to be a new URL due to its absence in the list, as indicated at a step 506. At a step 508, the new URL is added to the list or search index. Addition of the URL to the search index makes the URL available for searching and identification by a search engine that employs the search index. The new URL is thus made accessible via a search query provided to and executed by the search engine.

A virality of the URL is determined, as indicated at a step 510. The virality comprises any desired measure of the prevalence of the URL in the social-signal data. In an embodiment, the prevalence of the URL in the social-signal data corresponds with the level of user interest in the URL. In an embodiment, the virality is determined by identifying a number of occurrences of the URL in the social-signal data. One or more additional calculations or comparisons between the number of occurrences and previously acquired data or data for other URLs may be completed to determine a desired virality. For example, a large number of occurrences of the URL as compared to other URLs may indicate a high user interest. Or a large increase in the number of occurrences of the URL as compared to the same URL during a previous time period may indicate an increasing or spiking user interest in the URL.

At a step 512, the virality measurement is stored in a search index as metadata for the URL. The virality is stored in any desired manner that is useable by a search engine for identification and/or ranking of the URL as a search result candidate with other search results candidate URLs. For example, the virality might be stored as one or more values for corresponding variables used in a search engine's ranking algorithm.

In an embodiment, the search index is updated with the new URL substantially earlier than if RSS feeds or similar data files were relied upon. In another embodiment, the search index is updated with the new URL substantially earlier than if the search index was updated based on parsing published documents for URLs contained therein. Further, as the new URL is identified from a secondary source, e.g. the social-signal data, the search index may be updated with new URLs from domains that were previously unknown to the search-index-update server and not previously included in the search index.

Figure 6:
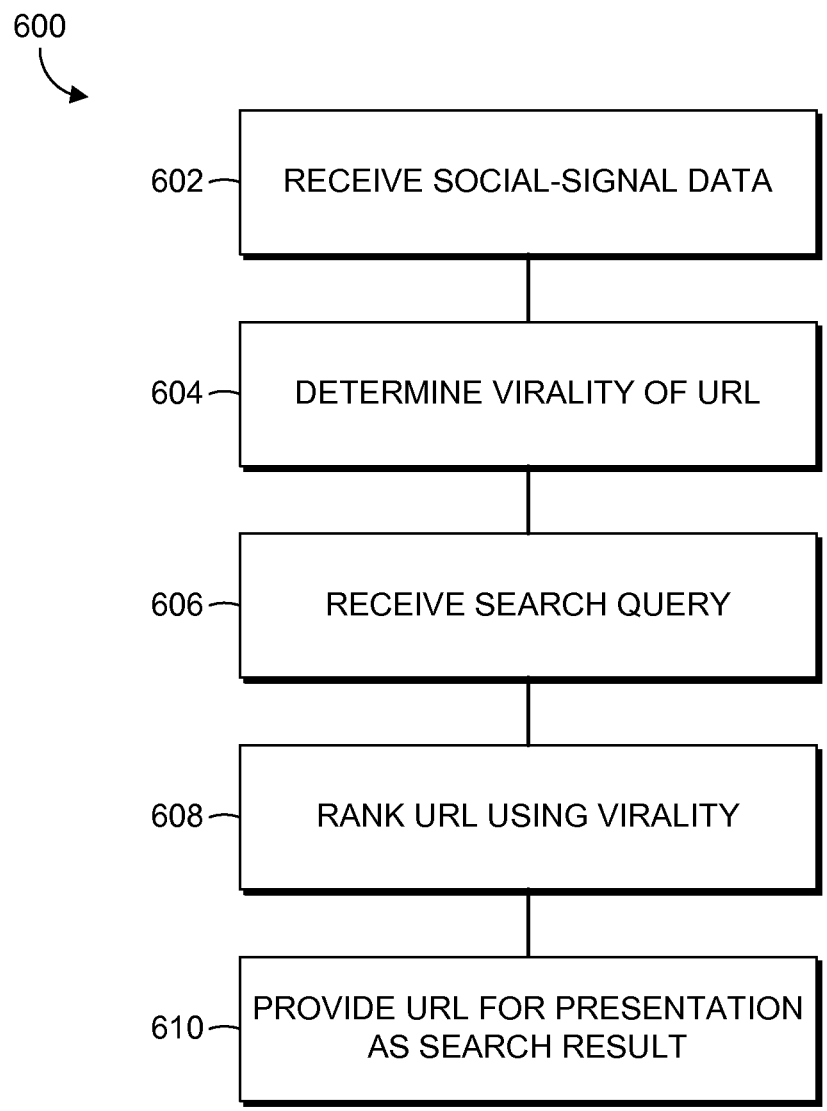
FIG. 6 is a flow diagram depicting a method for ranking a URL for placement on a search engine results page in accordance with an embodiment of the invention.

Referring now to FIG. 6, a method 600 for ranking a URL for placement on a search engine results page in accordance with an embodiment of the invention is described. Social-signal data that includes a URL is received at a step 602. In an embodiment, the social-signal data is received from one or more of the FACEBOOK and TWITTER social networks. The social-signal data might also be received from any other available social network. The social-signal data thus includes communications made by users of the FACEBOOK and TWITTER social networks such as "likes," "shares," "tweets" and "retweets" among others.

For example, a FACEBOOK user might indicate an interest in a URL associated with a story about Lady Gaga by clicking a "like" icon that is provided with the URL or in a document that is accessible using the URL, among other methods. The user might also share the URL with one or more other FACEBOOK users by selecting a "share" icon associated with the URL. Or the user can post the URL to a blog, microblog, or "wall" as is known to FACEBOOK users. Similarly, a user of TWITTER might generate a post or tweet to a blog or microblog that includes the URL. The user can also retweet or repost another user's posting to a second blog or microblog. Various other communications are available on FACEBOOK, TWITTER and other social networks—all of which are not described herein. But all such communications are understood as falling within the scope of the disclosure provided herein.

Accordingly, the social-signal data includes at least a portion of these communications. In an embodiment, the social-signal data includes the complete content of these communications including any URLs, links, images, and the like that are in the communications. For example, a user may generate a post such as "Check out this cool video!" that includes an image that is a hyperlink for a URL at which the video is located. The social-signal data then includes the content of the post (e.g. the text of the post), the image, and the hyperlink. In this instance, the URL is identified from the hyperlink associated with the image.

In another embodiment, the social-signal data is prepared or filtered to identify the URL from the hyperlink. The prepared/filtered social-signal data is then provided and includes the URL without the associated content of the post from which the URL is identified.

A virality of the URL is determined at a step 604 as described previously. In the instance that the URL is a known URL the virality data is stored with the URL as metadata therefor. When the URL is a new URL, the URL is added to the search index along with the associated virality metadata.

In an embodiment, the social-signal data includes the content of the communications made by the social-network users. The content of the communications is useable to provide additional information regarding the virality of the URL and/or to provide additional metadata for the URL. The content is analyzed to identify keywords or other useful attributes. In an embodiment, these attributes are useable to determine a user sentiment for the URL or a user intent for communicating the URL among other aspects of the communication. For example, the content of a user's communication of a URL might indicate that the user likes the URL (e.g. the content associated with the URL). Or the content of the communication might disparage the URL thus, indicating a dislike of the URL. In an embodiment, identified user sentiment and other attributes are used to provide additional signals for ranking the URL when identified as a search result candidate. One or more algorithms are employed to incorporate the user sentiment and other attributes into the virality for the URL. Or the sentiment and other attributes are stored as additional metadata for the URL.

At a step 606, a search query is received by a search engine. The search engine uses a search index to determine that the URL is a search result candidate for the search query. The search engine uses any desired method or algorithm for execution of the search query. The search engine also identifies a plurality of other URLs that are search result candidates for the search query, one or more of which might also be included in the social-signal data and might include virality metadata stored in the search index.

At a step 608, the virality metadata for the URL and for any other URLs identified as search result candidates is employed to rank the URLs. In an embodiment, a plurality of additional metadata and/or signals is employed to further inform the ranking. Other metadata and/or signals might include correlation with search query terms, data indicating paid placement or auctioned placement, user search history or browser history data, and user indicated search criteria or verticals, among a wide variety of others known in the art.

In an embodiment, the URL is a new URL and the virality metadata is the only or one of only a few data elements available for the URL. As such, the virality data is given increased weight as compared to other available signals. The increased weight may increase the URLs rank over other URLs that might have a more substantial collection of metadata and signals to inform the ranking.

At a step 610, the URL is provided for presentation as a search result in a search engine results page along with one or more of the other search result candidate URLs. With additional reference to FIG. 7, the presentation of the URL in a search engine results page may be that same as that used for any other search result as is known in the art, such as for example a search result 702. Or the URL might be grouped with one or more other URLs identified in the social-signal data and presented as a combined search result 704 that lists a plurality of URLs 706, 708 for which the social-signal data indicates a trend or increased user interest.

Figure 7:
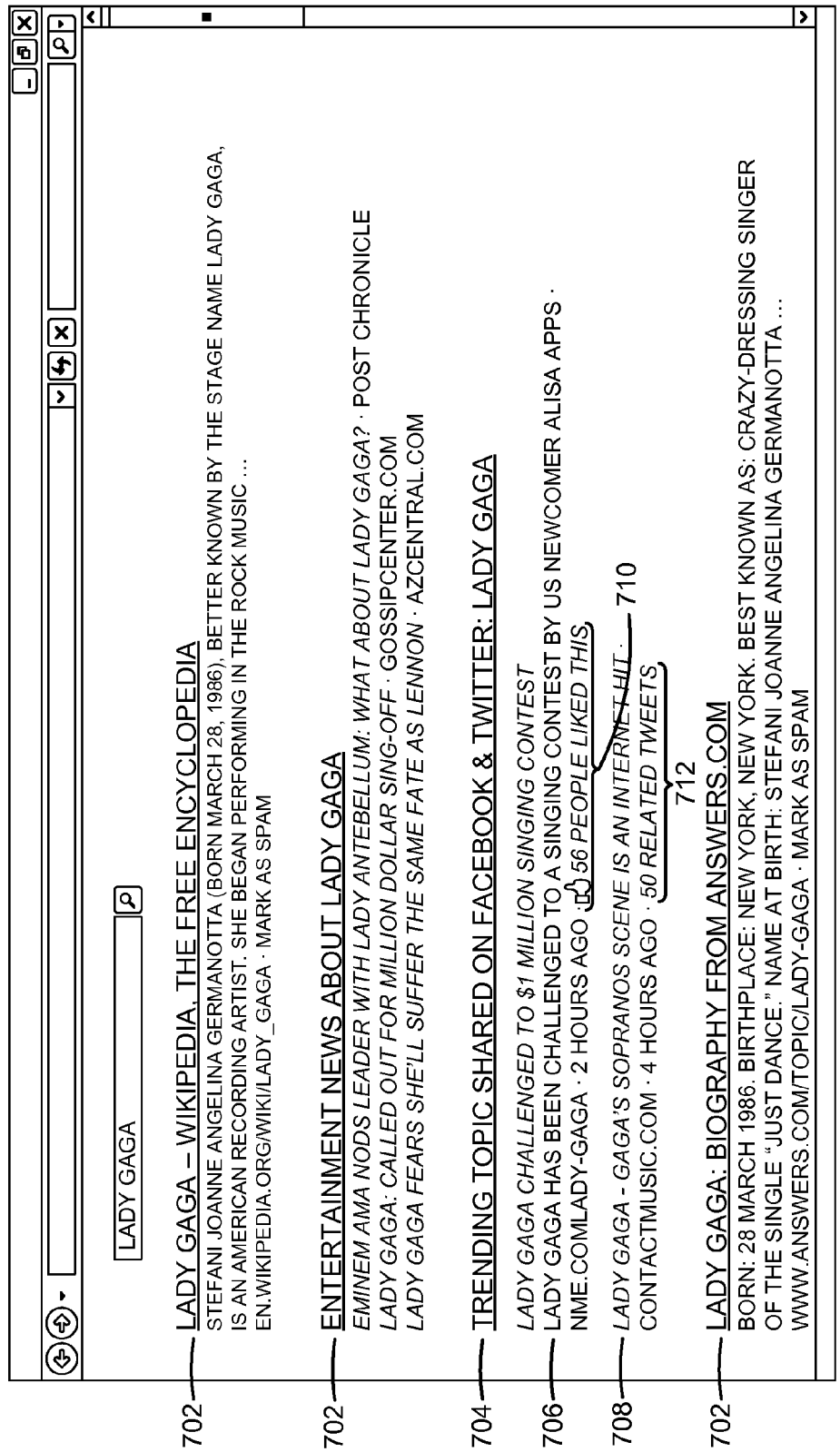
FIG. 7 is an illustration depicting an exemplary search engine results page that includes a combination search result and an indication of a virality of a URL in accordance with an embodiment of the invention.

In an embodiment, an indication 710, 712 of the virality of the URL is also provided. For example, as depicted in FIG. 7, a URL 706 is provided with an indication 710 that "56" people liked the URL, such as for example by "liking" the URL as is known on the FACEBOOK social network. Similarly, the URL 708 is provided with an indication 712 that "50" tweets from the TWITTER social network were found in the social-signal data that included the URL 708.

Figure 8:
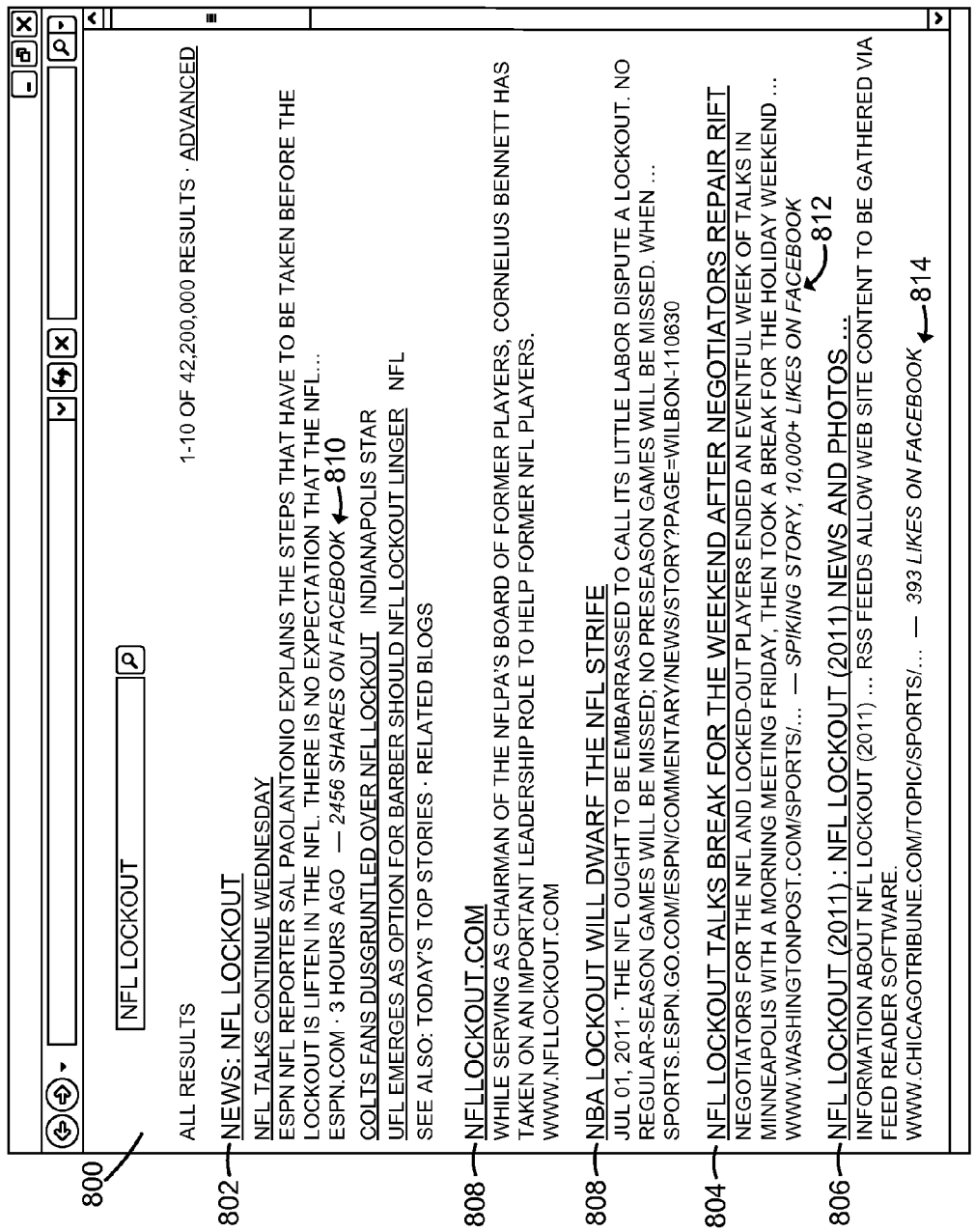
FIG. 8 is an illustration depicting an exemplary search engine results page that includes URLs that are ranked based at least partially on a virality in accordance with an embodiment of the invention.

With additional reference now to FIG. 8, in an embodiment, URLs 802, 804, 806 that have virality metadata and that are ranked using the virality metadata are presented in a search engine results page 800 in substantially the same way as one or more other URLs 808 that do not have virality metadata. In an embodiment, the URL 802 is a new URL for which the virality metadata is the only metadata available in the search index for ranking the URL 802. Due to a large number of occurrences of the URL 802 in the social-signal data and as indicated by the virality for the URL 802, the ranking of the URL 802 is increased. And, in this instance, the URL 802 is given the top rank for presentation in the search results page 800. As such, a new URL 802 for which very little metadata has been collected but, that exhibits a high level of user interest is provided in a prominent position in the search engine results page 800. Without embodiments of the invention, the URL 802 might be ranked very low due to the absence of data upon which to rank the URL 802 against other URLs that have accumulated metadata.

An indication 810 of the virality is also provided with the URL 802. The indication 810 depicts a number of "shares" of the URL 802 on the FACEBOOK social network however, any one or more forms of communication of the URL 802 found in the social-signal data may be indicated. And although the indication 810 is indicative of FACEBOOK "shares," the virality may be based social-signal data from a variety of communication types and from a variety of social networks. Each of the different types of communications and their associated social networks that are included in the social-signal data or indications thereof may be stored as metadata for the URL 802 in the search index. Or this metadata and/or the virality may be stored separate from the search index but is made accessible to a search engine that uses the search index.

The URLs 804 and 806 are also provided with indications 812 and 814, respectively, of their associated virality depicted in the social-signal data. The indication 812 displays a number of communications on the FACEBOOK social network ("10,000+") as well as a notification that the URL 804 is a "spiking story." Similarly, the indication 814 for the URL 806 shows that the URL 806 has been communicated "393" times on the FACEBOOK social network.

As such, a user viewing the search engine results page 800 is informed that the URL 804 is of great and increasing interest to users of at least the FACEBOOK social network generally. The user might also determine that that URL 804 is of greater interest than the URL 806 based on the indications 812 and 814. This determination may lead the user to select the URL 804 over the URL 806. The user might also decide that the website www.washingtonpost.com might have better coverage of the NFL lockout than the website www.chicagotribune.com.

In an embodiment, as shown the by indications 812 and 814, the social-signal data and virality allows search results to be presented that reflect "hot topics" or high current interest URLs that have an increasing user interest. For example, a known URL that historically is ranked low due to low user interest might suddenly become of great interest. A change in the interest in such a URL is identified via social-signal data and an associated virality. The URL is thus subsequently ranked higher based on the virality and is provided with an indication of the social-signal data.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. A computer-implemented method for identifying and ranking new URLs (uniform resource locator), the method comprising:

receiving, at a computing device having a processor and a memory, social-signal data from a social network, the social-signal data associated with communications made by users of the social network on the social network;

identifying a URL included in the social-signal data, wherein the URL is communicated by a user of the social network to one or more other users of the social network in the communication;

determining that the URL is a new URL based on the URL not being included in at least one search index of a search engine, wherein the at least one search index is used by the search engine to provide search results;

adding the URL to the at least one search index;

determining a virality of the new URL on the social network based on the received social-signal data, the virality being a measure of the communications made by the users of the social network referencing the URL on the social network during a period of time over a total number of communications made by users of the social network during the period of time; and storing the virality as metadata for the URL in the at least one search index;

receiving a search query for which the URL is a search result candidate;

ranking the URL against a plurality of other search results candidates based at least partially on the virality; and providing the URL for presentation as a search result on a search engine results page with respect to the ranking, wherein presentation of the URL as a search result on the search engine results page includes presentation of an indication of the measure of the communications made by the users referencing the URL.

2. The method of claim 1, further comprising:

receiving a search query at the search engine;

identifying the URL as a search result for the search query;

ranking the URL against a plurality of other search results based at least partially on the virality; and providing the URL for presentation as a search result based on the ranking.

3. The method of claim 2, wherein the URL is presented in a search engine results page with one or more additional URLs included in the social-signal data as a group of URLs that are of interest to social network users.

4. The method of claim 2, wherein the URL is presented in a search engine results page with an indication of one or more of an amount of communication of the URL by users using the social network, a type of communication of the URL by users using the social network, and a rate of change in the amount of communication of the URL by users using the social network.

5. The method of claim 1, wherein determining the virality of the URL further comprises:

determining a number of occurrences of the URL in the social-signal data over a period of time.

6. The method of claim 5, wherein determining the virality of the URL further comprises:

determining a change in the number of occurrences of the URL in the social-signal data over a period of time.

7. The method of claim 6, wherein the change includes a rate of change.

8. One or more computer-readable media having computer-executable instructions embodied thereon that, when executed by a computing device having a processor, perform a method for ranking a URL (uniform resource locator) for placement on a search engine results page, the method comprising:

receiving social-signal data from a social network, the social-signal data associated with communications made by users using a social networking website;

identifying a URL included in the social-signal data, wherein the URL is communicated by a user of the social network to one or more other users of the social network in the communications;

determining that the URL is a new URL based on the URL not being included in at least one search index of a search engine, wherein the at least one search index is used by the search engine to provide search results;

adding the URL to the at least one search index;

determining a virality of the URL based on received social-signal data, the virality being a measure of the communications made by the users of the social network referencing the URL on the social networking website during a period of time over a total number of communications made by users of the social network during the period of time;

storing the virality as metadata for the URL in the at least one search index;

receiving a search query for which the URL is a search result candidate;

ranking the URL against a plurality of other search results candidates based at least partially on the virality; and providing the URL for presentation as a search result on a search engine results page with respect to the ranking, wherein presentation of the URL as a search result on the search engine results page includes presentation of an indication of the measure of the communications made by the users referencing the URL.

9. The computer-readable media of claim 8, wherein the URL is a known URL that is already included in a search index.

10. The computer-readable media of claim 8, wherein the communications made by the users using the social networking website include one or more of an indication of interest in the URL, sharing the URL, and a post.

11. The computer-readable media of claim 8, wherein the URL is included in the communication in a shortened URL form.

12. The computer-readable media of claim 8, wherein the URL is included in the communication as a link.

13. A system for updating a search index with new URLs (uniform resource locator) and with metadata indicating a virality of the new URLs and known URLs based on social-signal data associated with communications on a social networking website, the system comprising one or more computing devices having a processor and a memory and configured to provide:

a receiving component configured to receive from a social network, social-signal data associated with user communications made using a social networking website, the communications including a URL therein, wherein the URL is communicated by a user of the social network to one or more other users of the social network in the communication;

a new-URL identification component configured to determine that the URL is one of a new URL based on the URL not being included in a search index or a known URL that is included in the search index, and to add the new URL to the search index;

a virality-determining component configured to determine a measure of the communications made by the users of the social network referencing the URL on the social networking website during a period of time over a total number of communications made by users of the social network during the period of time and to store the measure as metadata for the URL in the search index; and a ranking component configured to rank the URL against a plurality of other URLs based at least partially on the measure of the communications between users which reference the URL;

a searching component configured to receive a search query for which the URL is a search result candidate;

a search result ranking component configured to rank the URL against a plurality of other search results candidates based at least partially on the virality; and a search result presentation component configured to providing the URL for presentation as a search result on a search engine results page with respect to the ranking, wherein presentation of the URL as a search result on the search engine results page includes presentation of an indication of the measure of the communications made by the users referencing the URL.

14. The system of claim 13, further comprising:

a search engine component configured to receive a search query for which the URL is a search result candidate and to provide the URL for presentation as a search result on a search engine results page based on the rank of the URL.

15. The system of claim 14, wherein the measure includes a rate of change in a number of occurrences of the URL in the social-signal data over a period of time, and wherein the indication of the measure provides an indication of the rate.

16. The system of claim 14, wherein ranking the URL based at least partially on the measure of the communications associated with the URL on the social networking website incorporates a current level of interest in the URL into the ranking.

* * * * *